United States Patent
Isley, Jr. et al.

[11] Patent Number: 5,915,513
[45] Date of Patent: Jun. 29, 1999

[54] CLUTCH WITH MAGNETO-RHEOLOGICAL OPERATOR FOR TRANSFER CASES AND THE LIKE

[75] Inventors: Loren D. Isley, Jr., Clarkston; Ward D. McGinn, Brighton, both of Mich.

[73] Assignee: Borg-Warner Automotive, Inc., Sterling Heights, Mich.

[21] Appl. No.: 08/921,957

[22] Filed: Aug. 26, 1997

[51] Int. Cl.⁶ .......................... F16D 27/112; F16H 37/06
[52] U.S. Cl. .......................... 192/35; 192/21.5; 192/84.7; 180/247; 74/665 GE
[58] Field of Search .......................... 192/35, 21.5, 84.7, 192/84.1; 74/665 G, 665 GA, 665 GE, 665 T; 180/247

[56] References Cited

U.S. PATENT DOCUMENTS

| | | | |
|---|---|---|---|
| 4,444,298 | 4/1984 | Stangroom | 192/21.5 |
| 4,718,303 | 1/1988 | Fogelberg | 74/710.5 |
| 4,802,560 | 2/1989 | Bhadra et al. | 188/264 |
| 4,876,919 | 10/1989 | Nagano et al. | 180/247 X |
| 4,920,929 | 5/1990 | Bishop | 123/41.49 |
| 5,006,098 | 4/1991 | Yoshinaka et al. | 74/665 T X |
| 5,094,328 | 3/1992 | Palmer | 192/21.5 |
| 5,271,478 | 12/1993 | Kameda et al. | 74/665 T X |
| 5,275,252 | 1/1994 | Sperduti et al. | 180/247 |
| 5,277,281 | 1/1994 | Carlson et al. | 188/267 |
| 5,332,484 | 6/1994 | Reuter | 192/21.5 X |
| 5,358,084 | 10/1994 | Schramm | 192/21.5 |
| 5,398,917 | 3/1995 | Carlson et al. | 267/140.14 |
| 5,407,024 | 4/1995 | Watson et al. | 180/248 |
| 5,452,957 | 9/1995 | Duggan | 384/99 |
| 5,469,947 | 11/1995 | Anzai et al. | 192/21.5 |
| 5,492,312 | 2/1996 | Carlson | 267/140.14 |
| 5,499,951 | 3/1996 | Showalter | 74/665 GE X |
| 5,578,238 | 11/1996 | Weiss et al. | 252/62.52 |
| 5,584,776 | 12/1996 | Weilant et al. | 74/665 GE |
| 5,599,474 | 2/1997 | Weiss et al. | 252/62.52 |
| 5,620,072 | 4/1997 | Engle | 192/35 |
| 5,645,752 | 7/1997 | Weiss et al. | 252/62.54 |
| 5,649,459 | 7/1997 | Murakami et al. | 74/665 GE |

*Primary Examiner*—Charles A. Marmor
*Assistant Examiner*—Ankur Parekh
*Attorney, Agent, or Firm*—Brinks, Hofer, Gilson & Lione; Greg Dziegielewski

[57] ABSTRACT

A multiple disc clutch pack includes a pilot magneto-rheological operator which controls operation of an associated ball ramp operator which, in turn, compresses a clutch pack to selectively transfer torque between and input member and an output member. The pilot operator includes an electromagnetic coil disposed proximate a magneto-rheological fluid contained within a chamber of a pilot clutch. Activation of the electromagnetic coil creates a magnetic flux which travels through the magneto-rheological fluid and couples the fluid clutch members, creating drag and relative rotation between members of the ball ramp operator. Such relative rotation of the ball ramp operator selectively compresses the clutch pack and transfer torque from the input member to the output member.

20 Claims, 4 Drawing Sheets

CLUTCH WITH MAGNETO-RHEOLOGICAL OPERATOR FOR TRANSFER CASES AND THE LIKE

BACKGROUND OF THE INVENTION

The invention relates generally to a modulating clutch for use in a power transmission system and more particularly to a drive line clutch having a magneto-rheological pilot operator.

The performance advantages of four-wheel vehicle drive systems are well recognized. Improved vehicle stability while traversing rain soaked or ice or snow covered highways, handling and control on gravel or uneven pavement and simply maintaining traction in off-road situations are all readily acknowledged benefits. Concomitant though less desirable characteristics of four-wheel drive systems relate to increased vehicle weight and increased drive line friction which result in reduced gas mileage. Such increased drive line friction results from the increased number of driven components and is especially significant in systems which are engaged full-time.

Such full-time four-wheel drive systems with direct coupling between the front and rear prop shafts represents one of the earlier four-wheel drive line configurations. A significant shortcoming of this arrangement involves a variation of a problem addressed by conventional rear differentials. As a vehicle negotiates a corner, the front wheels traverse paths of longer average radius and length than the rear wheels. Hence, the front drive line must rotate more rapidly during a turn. If unable to do this, due to the common drive between the front and rear drive lines, the drive shafts will wind up in opposite directions until a force produced by the stored (wind-up) torque in the drive shafts exceeds the frictional forces acting on the tires, the tires momentarily lose frictional contact, the drive lines unwind and the vehicle hops. Such operating conditions are both unacceptable to design engineers and unsettling to drivers. Installing a conventional differential assembly between the two drive lines such that they were capable of rotation at slightly different speeds (just as the left and right rear axles of a conventional vehicle are able to accommodate rotational speed differences) solved the wind up problem.

The placement of a differential assembly between the front and rear prop shafts of a four-wheel drive vehicle then created a problem similar to that of a conventional differential in a rear axle: the unwanted ability of one tire with less traction to spin while the other tire with traction receives no power. In four-wheel drive vehicles, this problem was addressed, for example, by the device disclosed in co-owned U.S. Pat. No. 4,718,303. Here, an electromagnetic clutch assembly progressively locked elements of a center differential assembly in order to ensure power delivery to all four vehicle wheels.

Next, the differential was eliminated and an electromagnetic clutch was utilized to directly transfer torque from the primary drive line to the secondary drive line as needed. See, for example, co-owned U.S. Pat. No. 5,407,024. With an increasingly sophisticated array of vehicle condition sensors and a concomitant increase in the sophistication of computer software, it becomes apparent that improvements are also possible in the structure and operation of the electromagnetic clutch. The present invention is directed to such a device which provides enhanced speed of operation and improved modulating control.

SUMMARY OF THE INVENTION

A multiple disc clutch pack includes a pilot magneto-rheological operator which controls operation of an associated ball ramp operator which, in turn, compresses a clutch pack to selectively transfer torque between an input member and an output member. The pilot operator includes an electromagnetic coil disposed proximate a magneto-rheological fluid contained within a chamber of a pilot clutch. Activation of the electromagnetic coil creates a magnetic flux which travels through the magneto-rheological fluid proportionally coupling the clutch members and creating drag and relative rotation between members of the ball ramp operator. Such relative rotation between adjacent members of the ball ramp operator selectively compresses the clutch pack and transfer torque from the input member to the output member. The multiple disc clutch and magneto-rheological operator find application in drive lines and drive line components such as motor vehicle transfer cases.

Thus it is an object of the present invention to provide a clutch having a magneto-rheological pilot operator.

It is a further object of the present invention to provide a multiple disc pack clutch having a magneto-rheological pilot operator.

It is a still further object of the present invention to provide a multiple disc pack clutch having a magneto-rheological pilot operator and ball ramp operator.

It is a still further object of the present invention to provide a multiple disc pack clutch having a magneto-rheological pilot operator and ball ramp operator for use in vehicle drive lines.

It is a still further object of the present invention to provide a multiple disc pack clutch having a magneto-rheological pilot operator and ball ramp operator for use in transfer cases disposed in motor vehicle drive lines.

Further objects and advantages of the present invention will become apparent by reference to the following description of the preferred embodiment and appended drawings wherein like reference numbers refer to the same component, element or feature.

DESCRIPTION OF THE PREFERRED EMBODIMENT

Figure 1:
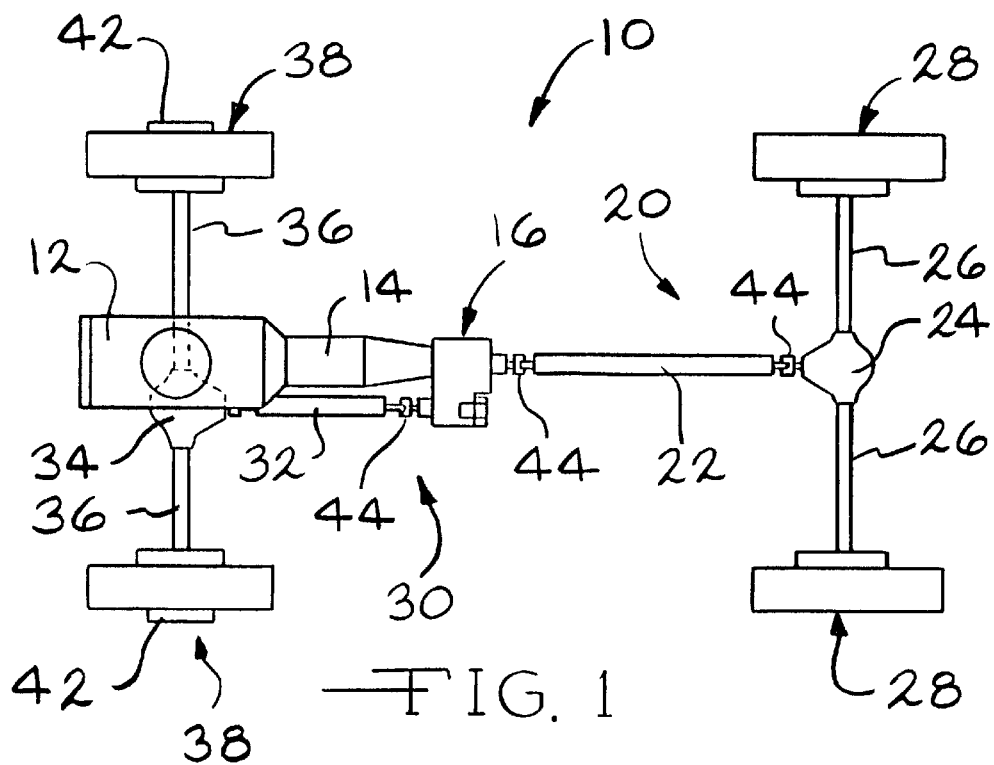
FIG. 1 is a diagrammatic, plan view of a motor vehicle drive line and transfer case incorporating the present invention.

Referring now to FIG. 1, a four-wheel vehicle drive train is diagrammatically illustrated and designated by the reference number 10. The four-wheel vehicle drive train 10 includes a prime mover 12 which is coupled to and directly drives a transmission 14. The transmission 14 may either be an automatic or manual type. The output of the transmission 14 directly drives a transfer case assembly 16 which provides motive power to a primary or rear drive line 20 comprising a primary or rear prop shaft 22, a primary or rear differential 24, a pair of live primary or rear axles 26 and a respective pair of primary or rear tire and wheel assemblies 28.

The transfer case assembly 16 also selectively provides motive power to a secondary or front drive line 30 comprising a secondary or front prop shaft 32, a secondary or front differential assembly 34, a pair of live secondary or front axles 36 and a respective pair of secondary or front tire and wheel assemblies 38. The front tire and wheel assemblies 38 may be directly coupled to a respective one of the pair of front axles 36 or, if desired, a pair of manually or remotely activatable locking hubs 42 may be operably disposed between the pair of front axles 36 and a respective one of the tire and wheel assemblies 38 to selectively connect same. Finally, both the primary drive line 20 and the secondary drive line 30 may include suitable and appropriately disposed universal joints 44 which function in conventional fashion to allow static and dynamic offsets and misalignments between the various shafts and components.

The foregoing and following description relates to a vehicle wherein the rear drive line 20 functions as the primary drive line, i.e., it is engaged and operates substantially all the time and, correspondingly, the front drive line 30 functions as the secondary drive line, i.e., it is engaged and operates only part-time or in a secondary or supplemental fashion, such a vehicle commonly being referred to as a rear wheel drive vehicle.

These designations "primary" and "secondary" are utilized herein rather than "front" and "rear" inasmuch as the invention herein disclosed and claimed may be readily utilized in transmissions and transfer cases wherein the primary drive line 20 is disposed at the front of the vehicle and the secondary drive line 30 is disposed at the rear of the vehicle; such designations primary and secondary thus broadly and properly characterizing the function of the individual drive lines rather than their specific locations.

Figure 2:
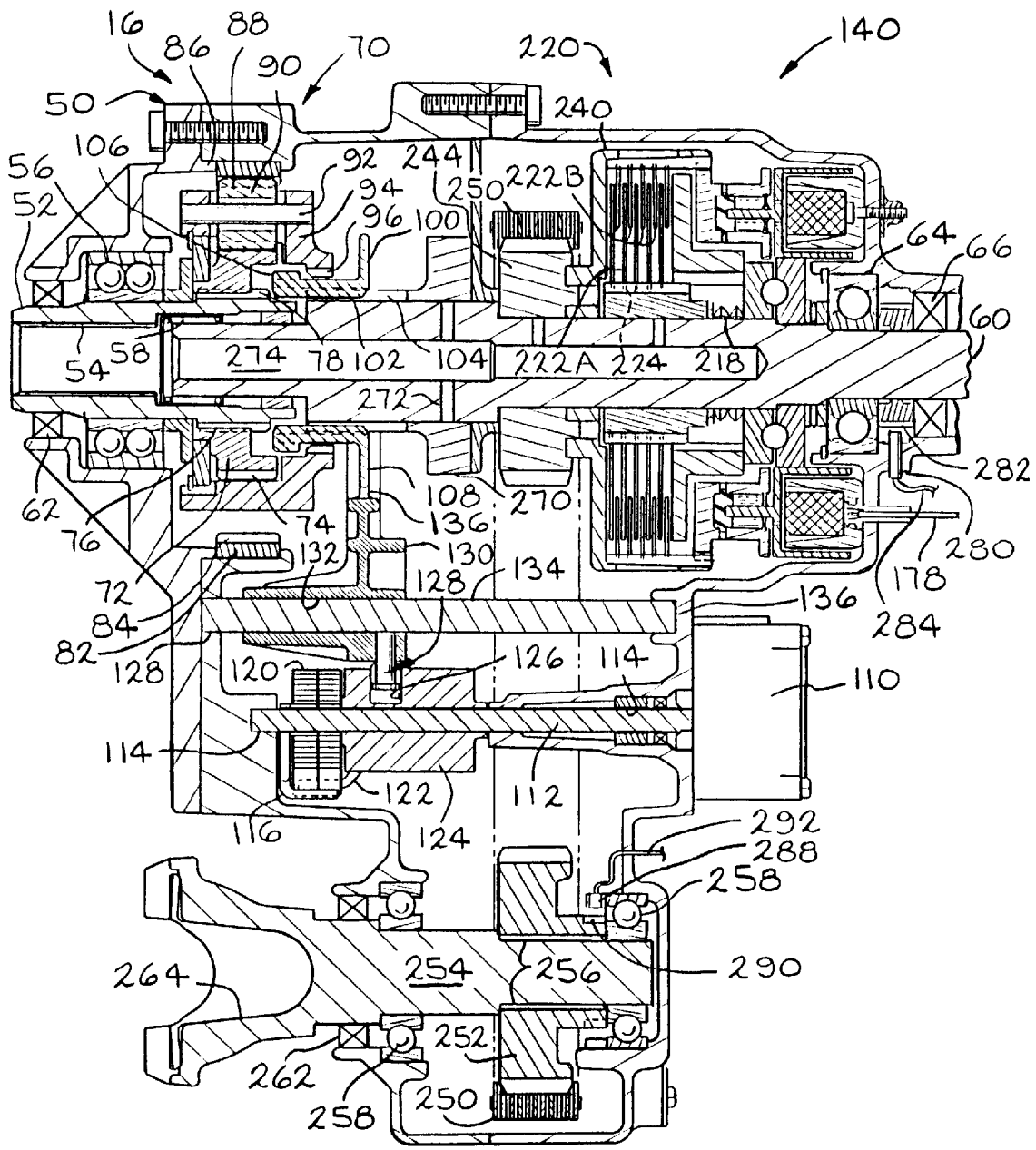
FIG. 2 is a full, sectional view of a motor vehicle drive line transfer case incorporating the present invention.

Referring now to FIGS. 1 and 2, the transfer case assembly 16 incorporating the present invention includes a multiple piece housing assembly 50 having planar sealing surfaces, openings for shafts and bearings and various recesses, shoulders, flanges, counterbores and the like to receive various components or assemblies of the transfer case 16. An input shaft 52 includes female or internal splines or gear teeth 54 or other suitable structure which drivingly couple the output of the transmission 14 illustrated in FIG. 1 to the input shaft 52. The input shaft 52 is rotatably supported at one end by an anti-friction bearing such as the ball bearing assembly 56 and at its opposite end by an internal anti-friction bearing such as the roller bearing assembly 58. The roller bearing assembly 58 is disposed upon a portion of a stepped output shaft 60. A suitable oil seal 62, positioned between the input shaft 52 and the housing assembly 50, provides an appropriate fluid tight seal therebetween. The opposite end of the output shaft 60 is supported by an anti-friction bearing such as the ball bearing assembly 64 and may include a flange or similar structure (not illustrated) which may be coupled to the universal joint 44 or may be secured to associated drive line components such as the primary prop shaft 22. A suitable oil seal 66, disposed between the output shaft 60 and the housing assembly 50, provides an appropriate fluid tight seal therebetween.

Referring now to FIG. 2, the transfer case assembly 16 includes a two-speed planetary gear drive assembly 70 disposed about the input shaft 52. The planetary drive assembly 70 includes a sun gear 72 having a plurality of male or external gear teeth 74 and a plurality of internal splines or gear teeth 76 which engage a complementary plurality of male splines or gear teeth 78 on the input shaft 52 having greater axial length than the sun gear 72. The sun gear 72 is thus coupled to the input shaft 52 and rotates therewith. Radially aligned with the sun gear 72 and its teeth 74 is a ring gear 82 having internal or female gear teeth 84. The ring gear 82 is retained within the housing assembly 50 by any suitable retaining structure such as a projection or lip 86 formed on portions of the housing assembly 50. A plurality of pinion gears 88 are rotatably received upon a like plurality of anti-friction bearings such as roller bearings 90 which, in turn, are supported and located by a like plurality of stub shafts 92. The plurality of stub shafts 92 are mounted within and secured to a planet carrier 94. The planet carrier 94 includes a plurality of female or internal splines or gear teeth 96 disposed generally adjacent the male splines or gear teeth 78 on the input shaft 52. The planetary gear assembly 70 is more fully described in co-owned U.S. Pat. No. 4,440,042 which is herein incorporated by reference.

The planetary drive assembly 70 also includes a dog clutch or clutch collar 100 defining elongate female or internal splines or gear teeth 102 which are axially aligned with and, in all respects, complementary to the male splines or gear teeth 78 on the input shaft 52. The clutch collar 100 and its internal splines or gear teeth 102 are slidably received upon a complementary plurality of male or external splines or gear teeth 104 on the stepped output shaft 60. The clutch collar 100 thus rotates with the output shaft 60 but may translate bi-directionally along it. The clutch collar 100 also includes male or external splines or gear teeth 106 on one end which are in all respects complementary to the female splines or gear teeth 96 on the planet carrier 94. The opposite end of the clutch collar 100 defines a circumferentially extending flange 108.

The clutch collar 100 is capable of three positions and operational modes. In FIG. 2, the clutch collar 100 is illustrated in its center or neutral position. In the center, neutral position the input shaft 52 is disconnected from the output shaft 60 and no power is transmitted therebetween. When the clutch collar 100 is moved to the left from the position illustrated in FIG. 2, direct drive is achieved wherein the internal splines or gear teeth 102 of the clutch collar 100 engage the external splines or gear teeth 78 on the input shaft 52 thereby directly coupling the input shaft 52 to the output shaft 60 and providing direct or high gear drive therebetween. When the clutch collar 100 is moved to the right from the position illustrated in FIG. 2, the speed reduction achieved by the planetary gear assembly 70 is engaged through engagement of the external splines or gear teeth 106 on the collar 100 with the internal splines or gear teeth 96 on the carrier 94 of the planetary gear assembly 70. So engaged, the planetary gear assembly 7 is active and provides a speed reduction, typically in the range of from 3:1 to 4:1 between the input shaft 52 and the output shaft 60.

The position of the clutch collar 100 is commanded by an electric shift control motor 110. The shift control motor 110 rotates a drive shaft 112 which is supported for rotation in the housing assembly 60 by bushings or bearings 114.

The drive shaft 112 terminates in an L-shaped arm 116 which is coupled to one end of a spiral spring assembly 120. The spring assembly 120 is wrapped about the drive shaft 112. The other end of the spring assembly 120 is coupled to an extension 122 which extends generally axially and couples the spring assembly 120 to a cylindrical cam 124. The spring assembly 120 functions as a resilient connection between the drive shaft 112 and the cylindrical cam 124 to absorb differences between the movement commanded by the shift control motor 110 and the clutch collar 100 so that the shift motor 110 may reach its final commanded position regardless of the position of the clutch collar 100.

The cylindrical cam 124 defines a helical cam path or track 126 which extends obliquely about the cylindrical cam 124. The helical track 126 receives a pin and cam follower assembly 128 which is coupled to and translates a shift fork assembly 130. The shift fork assembly 130 includes a through bearing aperture 132 which receives and supports the fork assembly 130 on a fixed shaft 134 for bi-directional translation. The shift fork assembly 130 includes a semi-circular yoke 136 which engages the flange 108 of the clutch collar 100. Rotation of the drive shaft 112 axially repositions the cam follower assembly 128 into one of the three positions described above. The spring assembly 120 allows smooth and fast response to commanded repositioning of the clutch collar 100 in situations where the internal splines or gear teeth 102 of the clutch collar 100 do not instantaneously engage the external splines or gear teeth 78 of the input shaft 52 or the external splines or gear teeth 106 of the clutch collar 100 do not instantaneously engage the splines or gear teeth 96 of the carrier 94. When rotation of the input shaft 52 or the carrier 94 allows engagement of the aforementioned clutch teeth, energy stored in the spring assembly 120 rotates the cylindrical cam 124 to its requested position, thus completing the shift.

It will be appreciated that the planetary gear assembly 70 including the drive mechanism of the clutch collar 100, which provides dual range, i.e., high and low speed, capability to the transfer case assembly 16 is optional and that the present invention is fully functional and may be utilized without these components and the dual speed range capability provided thereby.

Figure 3:
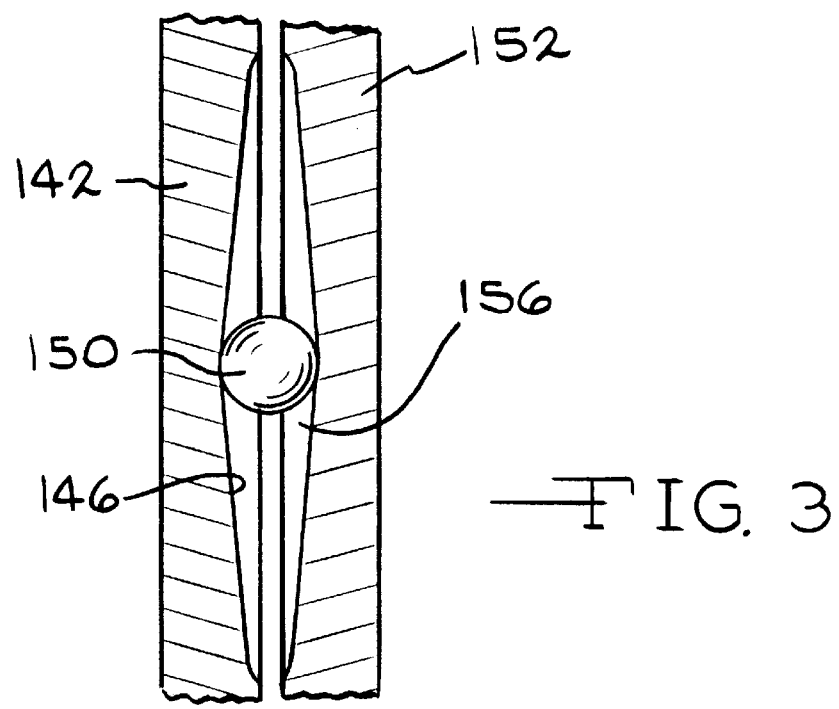
FIG. 3 is a flat pattern development of components of a ball ramp operator according to the present invention taken along line 3—3 of FIG. 4.
Figure 4:
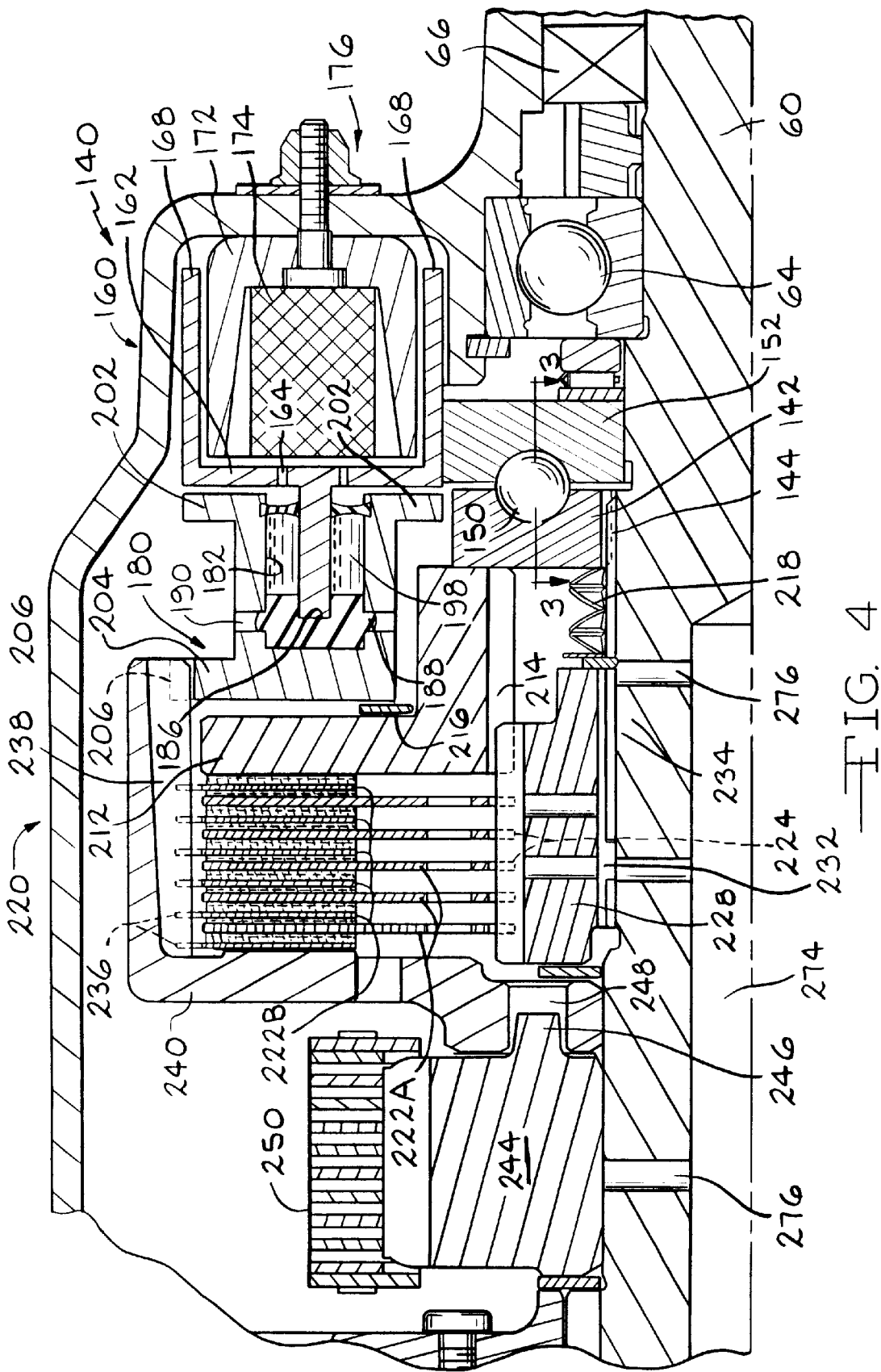
FIG. 4 is a fragmentary, full, sectional view of a disc pack clutch and magneto-rheological operator according to the present invention.
Figure 5:
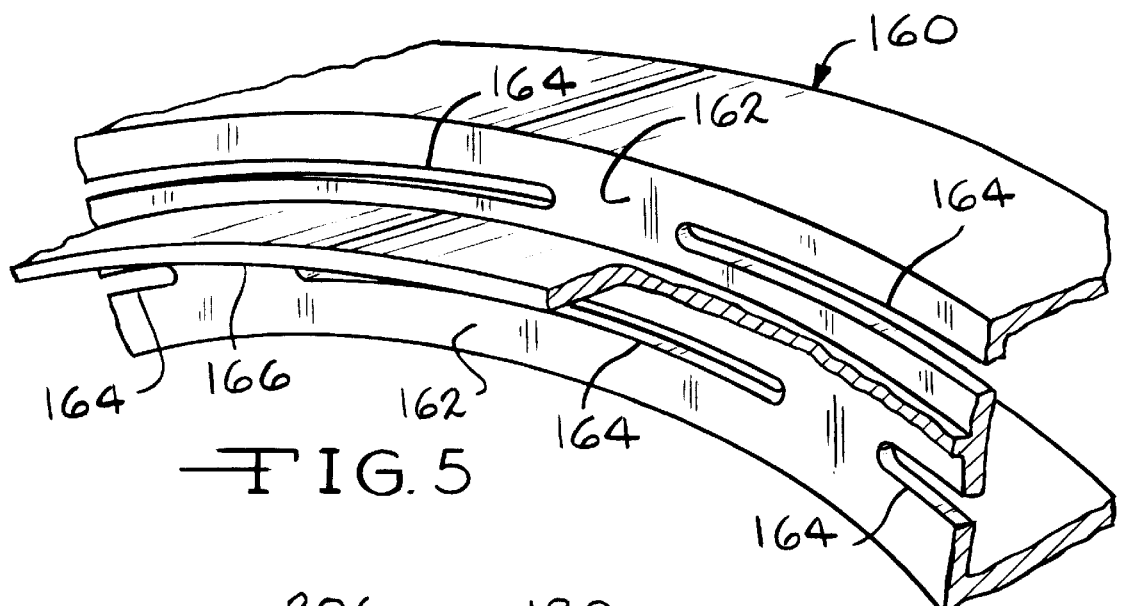
FIG. 5 is an enlarged, fragmentary, perspective view of a rotor assembly of a magneto-rheological operator according to the present invention.

Referring now to FIGS. 3, 4 and 5, the transfer case assembly 16 also includes an electromagnetically actuated disc pack type clutch assembly 140 incorporating the present invention. The clutch assembly 140 is disposed about the output shaft 60 and includes a circular drive member 142 coupled to the output shaft 60 through a splined interconnection 144. The circular drive member 142 includes a plurality of circumferentially spaced-apart recesses 146 having the shape of an oblique section of a helical torus, as illustrated in FIG. 3. Each of the recesses 146 receives one of a like plurality of load transferring balls 150.

A circular driven member 152 is disposed adjacent the circular drive member 142 and includes a like plurality of opposed recesses 156 defining the same shape as the recesses 146. The oblique side walls of the recesses 146 and 156 function as ramps or cams and cooperate with the balls 150 to drive the circular members 142 and 152 apart in response to relative rotation therebetween. It will be appreciated that the recesses 146 and 156 and the load transferring balls 150 may be replaced with other analogous mechanical elements which cause axial displacement of the circular members 142 and 152 in response to relative rotation therebetween. For example, tapered rollers disposed in complementarily configured conical helices may be utilized.

The circular driven member 152 extends radially outwardly and is secured to a soft iron rotor assembly 160 by, for example, an interference fit or welds. The rotor assembly 160 is generally U-shaped in cross-section and includes a radial surface portion 162 defining two circular regions of discontinuous banana slots 164 disposed adjacent a projecting center annulus 166. The rotor assembly 160 also includes two spaced-apart annular sidewalls 168 which extend from the radial portion 162 and partially surround a housing 172 containing an electromagnetic coil 174. The housing 172 is mounted in the housing assembly 50 of the transfer case assembly 16 by a plurality of threaded fastener assemblies 176. A single or two conductor cable 178 (illustrated in FIG. 2) provides electrical energy to the electromagnetic coil 174.

Figure 6:
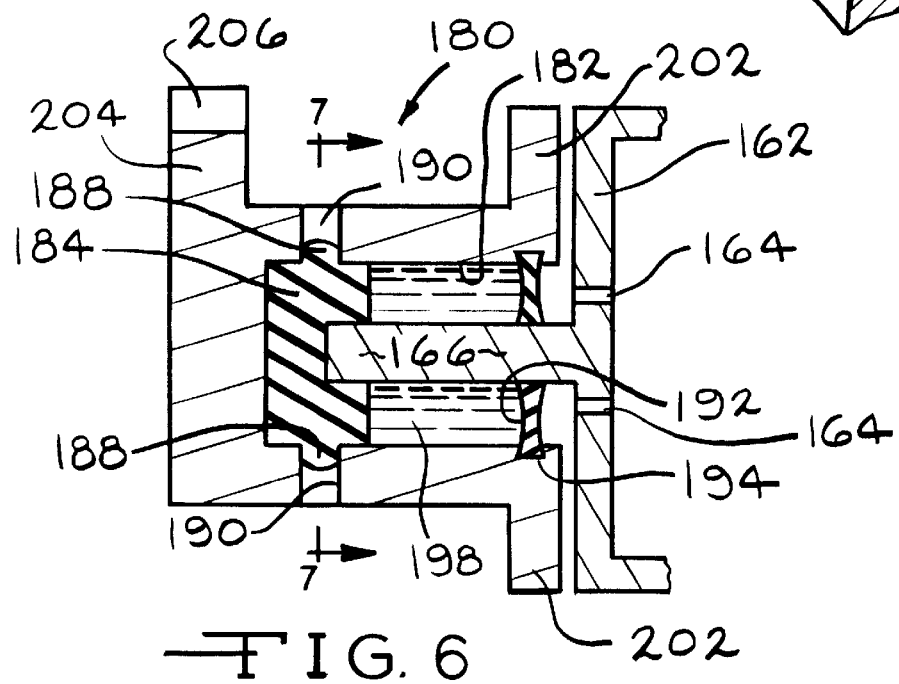
FIG. 6 is an enlarged, fragmentary, sectional view of a rotor and armature assembly of a magneto-rheological operator according to the present invention.
Figure 7:
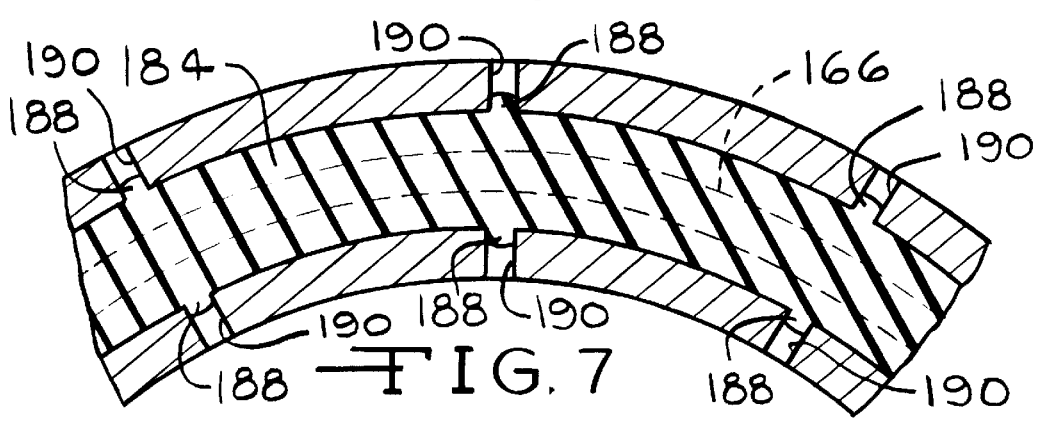
FIG. 7 is a fragmentary, sectional view of an armature assembly of a magneto-rheological operator according to the present invention taken along line 7—7 of FIG. 6.

As illustrated in FIGS. 4, 6 and 7, an armature assembly 180 is disposed adjacent the rotor assembly 160 and also defines a generally U-shaped member defining an annular chamber 182 which receives a substantial portion of the projecting center annulus 166 of the rotor assembly 160. An elastomeric annular sealing member 184 includes a circular channel 186 which receives the terminal portion of the projecting center annulus 166. The annular sealing member 184 is snugly received within the chamber 182 and include a plurality of short projections or nibs 188 on its inner and outer peripheries which are received within pairs of radially aligned passageways 190 which extend through the sidewalls of the armature assembly 180. At the end of the chamber 182 opposite the annular sealing member 184 are a pair of elastomeric, annular bow tie seals 192 which seal between the walls of the chamber 182 and the surfaces of the projecting center annulus 166. The bow tie seals 192 are retained within the armature assembly 180 in shallow, complementarily configured circumferential channels 194.

The elastomeric seals 184 and 192 fully seal the chamber 182 which is filled with a magneto-rheological fluid 198. The magneto-rheological fluid 198 is preferably a high viscosity magneto-rheological fluid such as manufactured by the Lord Corporation, Erie, Pa. One end of the armature assembly 180 includes a radially inwardly and outwardly extending circumferential flange 202 which cooperates with the rotor assembly 160 and the banana slots 164 to direct and concentrate magnetic flux from the electromagnetic coil 174 in the chamber 182 and specifically the magneto-rheological fluid 198. The other end of the armature assembly 180 includes a circumferential flange or web 204 which includes a plurality of external or male splines 206.

Providing electrical energy to the electromagnetic coil 174 through the cable 178 generates magnetic flux which is directed through the rotor assembly 160 and the armature assembly 180 and into the magneto-rheological fluid 198. The magnetic flux increases the viscosity of the magneto-rheological fluid 198 and increases drag between the rotor assembly 160 and the armature assembly 180. When the output shaft 60 is turning at a different speed than the armature assembly 180, this frictional drag results in a frictional torque being transferred from the output shaft 60, through the circular drive member 142, through the load transferring balls 150 and to the circular driven member 152. The resulting frictional torque causes the balls 150 to ride up the ramps of the recesses 146 and 156 and axially displace the circular drive member 142.

Axial displacement of the circular drive member 142 translates an apply plate 212 which includes a plurality of female or internal splines 214. A flat washer 216, preferably made of nylon or other non-ferrous or non-magnetic material, is disposed between the armature assembly 180 and the apply plate 212 and reduces friction and magnetic coupling therebetween. A compression spring 218 provides a restoring force which biases the circular drive member 142 toward the circular driven member 152 and returns the load transferring balls 150 to center positions in the circular recesses 146 and 156 to provide maximum clearance and minimum friction between the components of the electromagnetic clutch assembly 140 when it is deactivated An important design consideration of the recesses 146 and 156 and the balls 150 is that the geometry of their design, the design of the compression spring 218 and the clearances in the clutch assembly 140 ensure that it is not self-engaging. The electromagnetic clutch assembly 140 must not self-engage but rather must be capable of modulated operation and torque transfer in direct response to a modulating input signal.

The apply plate 212 acts upon a disc pack clutch assembly 220 which includes a plurality of interleaved friction plates or discs 222A and 222B. A first plurality of smaller diameter discs 222A include female or internal splines 224 which engage complementarily configured external or male splines 226 disposed on the periphery of a clutch hub 228. The internal splines 214 on the apply plate 212 also engage the external splines 226 on the clutch hub 228. The clutch hub 228, in turn, includes a set of female or internal splines 232 which engage a set of complementarily configured male or external splines 234 on the output shaft 60. Thus, the first plurality of discs 222A, the apply plate 212 and the clutch hub 228 all rotate with the output shaft 60. A second plurality of larger diameter friction plates or discs 222B are interleaved with the first plurality of discs 222A and include male or external splines 236 which engage complementarily configured female or internal splines 238 disposed on the inner circumferential surface of an annular clutch housing 240. The female or internal splines 238 of the clutch housing 240 also engage the male splines 206 on the web 204 of the armature assembly 180.

The annular clutch housing 240 is disposed for free rotation about the output shaft 60 and is rotationally coupled to a chain drive sprocket 244 by a plurality of projections or lugs 246 on the drive sprocket 244 which extend into complementarily configured recesses or apertures 248 defined by the annular housing 240. The drive sprocket 248 is also freely rotatably disposed on the output shaft 60. A drive chain 250 is received upon the teeth of the chain drive sprocket 244 and engages and transfers rotational energy to a driven chain sprocket 252. The driven chain sprocket 252 is coupled to a secondary output shaft 254 by an interengaging spline set 256. The secondary output shaft 254 is rotatably supported by a pair of anti-friction bearings such as ball bearing assemblies 258 and includes a suitably disposed oil seal 262. The secondary output shaft 254 may include a flange 264 which may be a portion of a universal joint 44 or other drive shaft component.

The transfer case assembly 60 also includes a gerotor pump 270 disposed about the output shaft 60 between the planetary gear assembly 70 and the chain drive sprocket 250. The gerotor pump 270 draws fluid lubricant and coolant from a sump (not illustrated) in the lowermost region of the housing assembly 50 and provides such lubricant under pressure through a plurality of radially oriented passageways 272 in the output shaft 60 to an axial passageway 274. The axial passageway 274 communicates with a plurality of radially oriented lubricating passageways 276 which provide fluid lubricant and coolant to the various bearings and components of the transfer case assembly 16.

Finally, the transfer case assembly 16 may include speed sensing or monitoring devices such as a Hall effect sensor 280 disposed in sensing relationship with a tone wheel 282 disposed about and secured to the output shaft 60. The Hall effect sensor 280 provides a signal in a line 284 representative of the rotational speed of the output shaft 60. Similarly, a second Hall effect sensor 288 is disposed in sensing relationship with a tone wheel 290 disposed about and secured to the secondary output shaft 254. The second Hall effect sensor 288 provides a signal in a line 292 representative of the speed of the secondary output shaft 254. Appropriate electronic scaling and computational devices may utilize the signals from the two Hall effect sensors 280 and 288 to, for example, control the engagement of the electromagnetic clutch assembly 140 according to defined relationships embodying the computer programs and software.

It will be appreciated that a transfer case assembly 16 according to the present invention provides improved proportional or modulating (proportional) control of torque transfer from the primary output shaft 60 and associated primary drive line to the secondary output shaft 254 and associated secondary drive line 30 due to the accurate, proportional control achieved by the use of the magneto-rheological fluid 198 and associated components the electromagnetic disc pack clutch assembly 140. The magneto-rheological fluid 198 exhibits exceptional repeatability and proportionality, that is, exceptionally good proportional correspondence between electrical input to the electromagnetic coil 174 and viscosity change.

Such accurate correspondence between electrical energy and fluid viscosity provides improved proportional control of the disc pack clutch assembly 140 and thus improved overall control of torque transfer between the primary output shaft 60 and the associated primary drive line 30 and the secondary output shaft 254 and the associated secondary drive line 30.

The foregoing disclosure is the best mode devised by the inventors for practicing this invention. It is apparent, however, that devices incorporating modifications and variations will be obvious to one skilled in the art of torque transfer clutches. Inasmuch as the foregoing disclosure presents the best mode contemplated by the inventor for carrying out the invention and is intended to enable any person skilled in the pertinent art to practice this invention, it should not be construed to be limited thereby but should be construed to include such aforementioned obvious variations and be limited only by the spirit and scope of the following claims.

We claim:

1. A clutch for disposition in a drive line of a motor vehicle comprising, in combination, an input member, an output member, a clutch assembly for selectively coupling said input member and said output member, and a clutch operator assembly including a pair of adjacent members, one of said adjacent members connected to said input member for rotation therewith, each of said adjacent members having a face defining a plurality of recesses arranged in opposed relationship, a like plurality of rolling members disposed in said recesses, a stationary electromagnetic coil, a rotor assembly coupled to an other of said adjacent members for rotation therewith, said rotor having a circular plate, a single annulus extending in one direction from said circular plate and a pair of spaced apart annuli extending in an opposite direction from said circular plate, said pair of annuli at least partially surrounding said electromagnetic coil, an armature assembly adjacent said rotor assembly and connected to said output member for rotation therewith, said armature assembly including an annular chamber for receiving said single annulus of said rotor assembly, seals disposed between said armature assembly and said rotor assembly for sealing said annular chamber and a magneto-rheological fluid disposed in said annular chamber.

2. The drive line clutch of claim 1 wherein said clutch assembly includes a first plurality of clutch discs coupled to said input member and interleaved with a second plurality of clutch discs coupled to said output member.

3. The drive line clutch of claim 1 further including an apply plate disposed between said clutch assembly and said one of said members and connected to said input member for rotation therewith.

4. The drive line clutch of claim 1 further including a plurality of curved circumferentially extending slots in said rotor assembly arranged coaxially with said annulus.

5. The drive line clutch of claim 1 wherein said seals are flexible, elastomeric seals mounted in said armature assembly.

6. The drive line clutch of claim 1 further including a transfer case having an input shaft driving said input member, a first output driven by said input shaft and a second output driven by said output member.

7. The drive line clutch of claim 6 further including a speed reduction assembly having an output driving said input member.

8. A clutch for disposition in a power transmission system comprising, in combination,
an input member,
an output member,
a clutch assembly for selectively transferring torque between said input member and said output member,
a clutch operator assembly including a pair of adjacent plates, one of said plates connected to said input member for rotation therewith, each of said plates having a face defining a plurality of recesses arranged in opposed relationship, a like plurality of load transferring members disposed in said recesses, a electromagnetic coil, a rotor coupled to an other of said plates for rotation therewith, said rotor having a circular plate and a pair of spaced apart annuli extending from said circular plate, said pair of annuli at least partially surrounding said electromagnetic coil, an armature adjacent said rotor and connected to said output member for rotation therewith,
a magneto-rheological assembly operably disposed between said rotor and said armature and adjacent said electromagnetic coil, one of said rotor and said armature defining an annular chamber and the other of said rotor and said armature defining an annular member projecting into said chamber, a magneto-rheological fluid disposed in said annular chamber and seals for maintaining said magneto-rheological fluid in said annular chamber, whereby magnetic flux generated by said electromagnetic coil increases the viscosity of said magneto-rheological fluid.

9. The power transmission system clutch of claim 8 wherein said clutch assembly includes a plurality of interleaved friction discs, a first plurality of said friction discs operably coupled to said input member and a second plurality of said discs coupled to said output member.

10. The power transmission system clutch of claim 9 further including an apply plate disposed between said clutch assembly and said one of said adjacent plates and connected to said input member for rotation therewith.

11. The power transmission system clutch of claim 8 further including a plurality of curved circumferentially extending slots in said rotor arranged coaxially with said annular member.

12. The power transmission system clutch of claim 8 further including a transfer case having an input shaft driving said input member, a first output driven by said input shaft and a second output driven by said output member.

13. The power transmission system clutch of claim 8 wherein said armature includes inner and outer radially aligned flanges adjacent said annular chamber for directing magnetic flux into said annular chamber.

14. A clutch for disposition in the drive line of a power transmission system comprising, in combination,
an input member,
an output member,
a clutch assembly for selectively coupling said input member and said output member, and
a clutch operator assembly including a pair of adjacent members defining cam surfaces and cooperating cam devices for separating said adjacent members upon relative rotation, one of said adjacent members disposed for rotation with said input member, an electromagnetic coil, a rotor assembly disposed for rotation with an other of said adjacent members, said rotor having a circular plate defining first and second opposed faces, a singular annulus extending in one direction from one of said faces of said circular plate and a pair of spaced apart annuli extending in an opposite direction from the other of said faces of said circular plate, said pair of annuli at least partially surrounding said electromagnetic coil, an armature assembly disposed adjacent said rotor assembly and connected to said output member for rotation therewith, said armature assembly including an annular chamber for receiving said single annulus of said rotor assembly, seals disposed between said armature assembly and said rotor assembly and a magneto-rheological fluid disposed in said annular chamber, whereby activation of said electromagnetic coil generates magnetic flux in said magneto-rheological fluid, increasing its viscosity, causing drag between said armature assembly and said rotor assembly and engaging said clutch assembly.

15. The drive line clutch of claim 14 wherein said clutch assembly includes a first plurality of clutch discs coupled to said input member and interleaved with a second plurality of clutch discs coupled to said output member.

16. The drive line clutch of claim 15 further including an apply plate disposed between said clutch assembly and said one of said members and connected to said input member for rotation therewith.

17. The drive line clutch of claim 15 further including a plurality of curved circumferentially extending slots in said rotor arranged coaxially with said annulus.

18. A transfer case for providing torque to a primary drive line and a secondary drive line of a motor vehicle comprising, in combination,
an input member coupled to a primary drive line,
an output member coupled to a secondary drive line,
a clutch assembly for selectively transferring torque between said input member and said output member,
a clutch operator assembly including a pair of adjacent members defining cam surfaces and cooperating cam devices for separating said adjacent members upon relative rotation, one of said adjacent members disposed for rotation with said input member, an electromagnetic coil, a rotor assembly disposed for rotation with an other of said adjacent members, said rotor having a circular plate and a pair of spaced apart annuli extending from said circular plate, said pair of annuli at least partially surrounding said electromagnetic coil, an armature assembly adjacent said rotor assembly and connected to said output member for rotation therewith, a magneto-rheological assembly operably disposed between said rotor and said armature and operably adjacent said electromagnetic coil, one of said rotor and said armature defining an annular chamber and the other of said rotor and said armature defining an annular member projecting into said chamber, a magneto-rheological fluid disposed in said annular chamber and seals for maintaining said magneto-rheological fluid in said annular chamber.

19. The transfer case of claim 18 wherein said clutch assembly includes a first plurality of clutch discs coupled to said input member and interleaved with a second plurality of clutch discs coupled to said output member.

20. The transfer case of claim 18 further including a speed reduction assembly having an output driving said input member.

* * * * *